United States Patent [19]

Lutes, Jr. et al.

[11] 4,287,606
[45] Sep. 1, 1981

[54] FIBER OPTIC TRANSMISSION LINE STABILIZATION APPARATUS AND METHOD

[76] Inventors: Robert A. Frosch, Administrator of the National Aeronautics and Space Administration, with respect to an invention of George F. Lutes, Jr., Glendale; Kam Y. Lau, Pasadena, both of Calif.

[21] Appl. No.: 188,160

[22] Filed: Sep. 17, 1980

[51] Int. Cl.³ ............................................... H04B 9/00
[52] U.S. Cl. ..................................... 455/617; 455/610; 455/615; 455/612
[58] Field of Search ................. 455/610, 612, 615, 617

[56] References Cited

U.S. PATENT DOCUMENTS

| | | | |
|---|---|---|---|
| 3,571,597 | 3/1971 | Wood | 455/607 |
| 3,887,876 | 6/1975 | Zeidler | 455/610 |
| 3,953,727 | 4/1976 | d'Auria | 455/610 |
| 4,102,572 | 7/1978 | O'Meara | 455/606 |
| 4,234,971 | 11/1980 | Lutes | 455/619 |

*Primary Examiner*—Howard Britton
*Attorney, Agent, or Firm*—Monte F. Mott; John R. Manning; Paul F. McCaul

[57] ABSTRACT

A fiber optic transmission line stabilizer for providing a phase-stabilized signal at a receiving end of a fiber optic transmission line (26) with respect to a reference signal at a transmitting end of the fiber optic transmission line (26) so that the phase-stabilized signal will have a predetermined phase relationship with respect to the reference signal regardless of changes in the length or dispersion characteristics of the line (26). More particularly, a reference signal of RF frequency modulates a 0.85 micrometer wavelength optical transmitter (20). The output of the optical transmitter (20) passes through a first optical filter (24) and a voltage-controller phase shifter (22), the output of the phase shifter (22) being provided to the fiber optic transmission line (26). At the receiving end of the fiber optic transmission line (26), the signal is demodulated, the demodulated signal being utilized to modulate a 1.06 micrometer optical transmitter (34). The output signal from the 1.06 micrometer optical transmitter (34) is provided to the same fiber optic transmission line (26) and passes through the voltage-controlled phase shifter (22) to a phase error detector (36). The phase of the modulation of the 1.06 micrometer wavelength signal is compared to the phase of the reference signal by the phase error detector (36), the detector (36) providing a phase control signal related to the phase difference. This control signal is provided to the voltage controlled phase shifter (22) which alters the phase of both optical signals passing therethrough until a predetermined phase relationship between modulation on the 1.06 micrometer signal and the reference signal is obtained.

21 Claims, 8 Drawing Figures

FIBER OPTIC TRANSMISSION LINE STABILIZATION APPARATUS AND METHOD

ORIGIN OF THE INVENTION

The invention described herein was made in the performance of work under a NASA contract and is subject to the provisions of Section 305 of the National Aeronautics Space Act of 1958, Public Law 85-568 (72 Stat. 435, 42 USC 2457).

TECHNICAL FIELD

The invention relates to phase stabilization apparatus and methods for phase stabilizing a reference signal transmitted through a fiber optic transmission line. More particularly, the invention provides a means for synchronizing the phase of a reference signal at a receiving end of the fiber optic transmission line with respect to a reference signal at a transmitting end of the fiber optic transmission line so that a predetermined phase relationship between the two can be maintained even though the line length and/or the propagation delay may change due to temperature and/or pressure effects.

BACKGROUND ART

To transmit time and frequency standards with accuracies approaching one part in $10^{14}$, feedback systems have been conventionally utilized to stabilize the transmission path against external influences. Some existing systems utilize coaxial lines as the transmitting path. For stabilization, a signal at the receiving end of the path is transmitted through the same path back to the transmitting end where its phase is compared with a standard reference source. Any phase fluctuations at the end of the path are corrected by a voltage-controlled phase shifter inserted in the path. However, reflections along the coaxial line utilizing this method are highly undesirable as they add signals travelling in opposite directions and vary the phase of the originally transmitted signal. Attempts to avoid this problem have resulted in utilizing forward and backward signals of different frequencies so that they can be easily isolated with filters. However, line dispersion and dispersion in the voltage-controlled phase shifter produce errors in phase correction which render it impossible to achieve an accuracy of one part in $10^{14}$. The apparatus and method provided by the invention eliminate these problems by transmitting the reference signal as modulation upon an optical signal, thus allowing a fiber optic transmission line to be utilized as the transmission path. The apparatus includes a novel optical phase shifter that is utilized to stabilize the propagation delay through the fiber optic transmission line.

STATEMENT OF INVENTION

The invention provides a fiber optic transmission line stabilizer for providing a phase stabilized reference signal at a receiving end of a fiber optic transmission line, the phase stabilized reference signal having a predetermined phase relationship with respect to a first reference signal provided at a transmitting end of the fiber optic transmission line. The stabilizer includes a means for providing a first optical signal modulated by the first reference signal to the fiber optic transmission line transmitting end, the first optical signal being at a first optical wavelength. A means for developing a second reference signal related to the modulation on the first optical signal after having passed through the fiber optic transmission line is provided. A second optical signal which is modulated by the second reference signal is provided to the fiber optic transmission line receiving end, the second optical signal being at a second optical wavelength. Also provided is a means for simultaneously altering the phase of the modulation on the first optical signal and the phase of the modulation on the second optical signal in response to a phase control signal. The stabilizer also includes a means for generating the phase control signal in response to a phase difference between the first reference signal and the modulation on the second optical signal after having been altered by the means for simultaneously altering, thereby resulting in the second reference signal having a predetermined phase relationship with respect to the first reference signal. The second reference signal then becomes the phase stabilized reference signal. The invention also provides a method for providing a phase stabilized reference signal at a receiving end of a fiber optic transmission line.

More particularly, a fiber optic transmission line stabilizer is provided which modulates a 0.85 micrometer wavelength transmitter with an RF reference signal. The modulated 0.85 micrometer wavelength signal is provided through a novel voltage-controlled phase shifter to a fiber optic transmission line. The signal as received at the receiving end of the fiber optic transmission line is demodulated, the demodulated signal being provided to modulate a 1.06 micrometer wavelength optical transmitter. The 1.06 micrometer wavelength signal is transmitted back through the fiber optic transmission line and voltage controlled phase shifter to a phase error detector which generates a phase control signal for the voltage-controlled phase shifter that is related to the phase difference between the modulation on the 1.06 micrometer signal and the RF reference signal. Thus, the voltage-controlled phase shifter controls the phase shift of both the outgoing and incoming signals until a predetermined phase relationship therebetween is achieved. This predetermined phase relationship thus assures that the reference signal at the receiving end of the fiber optic transmission line has a predetermined phase relationship with respect to the RF reference signal.

The voltage-controlled phase shifter utilized in the apparatus is also novel. It includes a voltage-controlled directional coupler having two outputs, the amplitude of the signal at each output being related to the amplitude of an input signal and the phase control signal from the phase error detector. One coupler output passes through an optical delay line and is then summed with the other coupler output, this sum signal then having a phase relationship with respect to a first optical input signal that is determined by the phase control signal from the phase error detector. In a similar manner, a second optical input signal is split into two signals, one of which is passed through the optical delay line to the directional coupler and the other of which is passed directly to the directional coupler. These two signals are summed by the directional coupler so that the resultant signal has a phase shift related to the phase shift introduced in the first optical input signal. It has been found that this novel voltage controlled phase shifter compensates for most line dispersion.

Thus, instead of utilizing two different radio frequencies for forward and backward signals as in conventional systems, two different optical frequencies each being modulated by a reference signal are utilized. The advantages of utilizing modulated optical signals include the separation of forward and backward signals with optical filters, thereby allowing radio frequency mixers and frequency dividers used in present RF systems to be avoided. The usual advantages of fiber optic links such as small size, light weight, and insensitivity to electromagnetic interference and ground loop problems can be realized.

BEST MODE FOR CARRYING OUT THE INVENTION

Detailed illustrative embodiments of the invention disclosed herein exemplify the invention and are currently considered to be the best embodiments for such purposes. They are provided by way of illustration and not limitation of the invention. Various modifications thereof will occur to those skilled in the art, and such modifications are within the scope of the claims which define the present invention.

Figure 1:
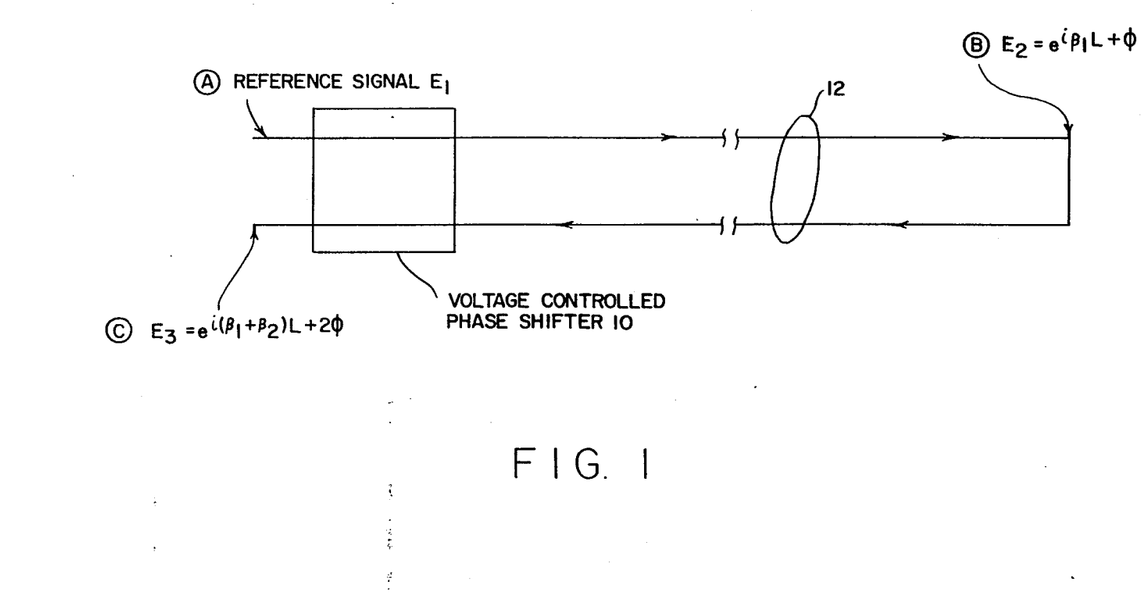
FIG. 1 is a schematic diagram showing a phase relationship between a reference signal provided at a transmitting end of a transmission line, the reference signal as received at a receiving end of the transmission line, and the reference signal as returned through the transmission line back to the transmitting end.

By way of background, a transmission of time and frequency standards with accuracies approaching one part in $10^{14}$ requires some type of feedback system in order to stabilize transmission paths against external influences. In a typical stabilization system utilizing a coaxial cable, a standard reference source, which could be a hydrogen maser, is connected to the coaxial cable. A reference signal from the standard source is transmitted through the coaxial cable and returned through the same cable where its phase is compared with the reference signal. Any phase fluctuations at the transmitting end of the path are corrected by a voltage-controlled phase shifter inserted in the path of the outgoing and incoming signals. Reflections along the transmission line are highly undesirable because such reflections add signals travelling in opposite directions and vary their phases. This can be avoided if the forward and backward signals are of different frequencies so that they can easily be isolated by filters. However, dispersions in the line and the voltage-controlled phase shifter produce errors in phase correction as is evident from the analysis below. Referring to FIG. 1, a reference signal $E_1$ passes through a voltage-controlled phase shifter 10 and coaxial cable 12 to a receiving end B where the received signal is designated as $E_2$. Received signal $E_2$ is then retransmitted back through the coaxial cable 12, the phase shifter 10, and arrives at C where the signal is designated as $E_3$. Signal $E_2$ has a phase shift of $(\beta_1 L + \phi)$ where L is the length of the line, $\beta_1$ the forward propagation constant, and $\phi$ the phase shift introduced by the voltage-controlled phase shifter 10. On return of signal $E_2$ through the coaxial cable 12, the propagation constant is $\beta_2$ which may be different from $\beta_1$. Signal $E_3$ has a phase shift of $(\beta_1 + \beta_2)L + 2\phi$ with respect to the reference signal $E_1$. Now, for example, if the length of the line is changed from L to $L + \Delta L$ due to a temperature change or any other reason, then the phase of $E_3$ is changed, and the feedback system will produce a signal to change $\phi$ and compensate for the change in line length. The required change in the voltage-controlled phase shifter 10 is thus $\Delta \phi$ which equals $-(\beta_1 + \beta_2)\Delta L$. With this change, however, the phase of $E_2$ is $$\beta_1(L+\Delta L)+\phi+\Delta\phi = [(\beta_1-\beta_2)/2]\Delta L + \beta_1 L + \phi$$

and is a function of $\Delta L$; i.e., the phase of $E_2$ is not stabilized unless $\beta_1$ equals $\beta_2$. Thus, it should be apparent that the forward and backward signals through the coaxial cable 12 must propagate through the same line and the same voltage-controlled phase shifter in order to achieve phase stabilization of $E_2$. The stabilizer disclosed herein eliminates the above difficulties by utilizing an optical transmission line having a radio frequency modulated optical signal transmitted through the line for frequency and time standard distribution. Line dispersion of the modulated optical wave is virtually zero at all radio frequencies. However, a phase shift cannot be performed directly on an optical signal, for a phase shift in the RF modulation of a quarter cycle would mean a change in path length of 16 meters and a continuously variable optical delay line covering such a wide range is not available. The stabilizer disclosed herein modulates a reference microwave signal on an optical signal via a first optical transmitter, the output of which is transmitted at a first optical frequency through a voltage-controlled phase shifter to a demodulator at the receiving end of the fiber optic transmission line wherein the modulation is recovered and a reference signal derived therefrom. This signal is utilized to modulate a second optical transmitter, the output of which is transmitted back through the same fiber optic transmission line and through the voltage-controlled phase shifter to a phase error detector. The phase error detector detects a phase difference between the original reference signal and the modulation on the second optical signal after having passed through the voltage-controlled phase shifter. The phase error detector provides an output signal which controls the voltage-controlled phase shifter until the phase relationship between the returned signal and the reference signal is at a predetermined value. This closed loop system thus insures that the phase of the signal received at the receiving end of the optical transmission line maintains a predetermined phase relationship with respect to the reference signal, thereby providing an output signal which is phase stabilized regardless of changes in path length of the fiber optic transmission line.

Figure 2:
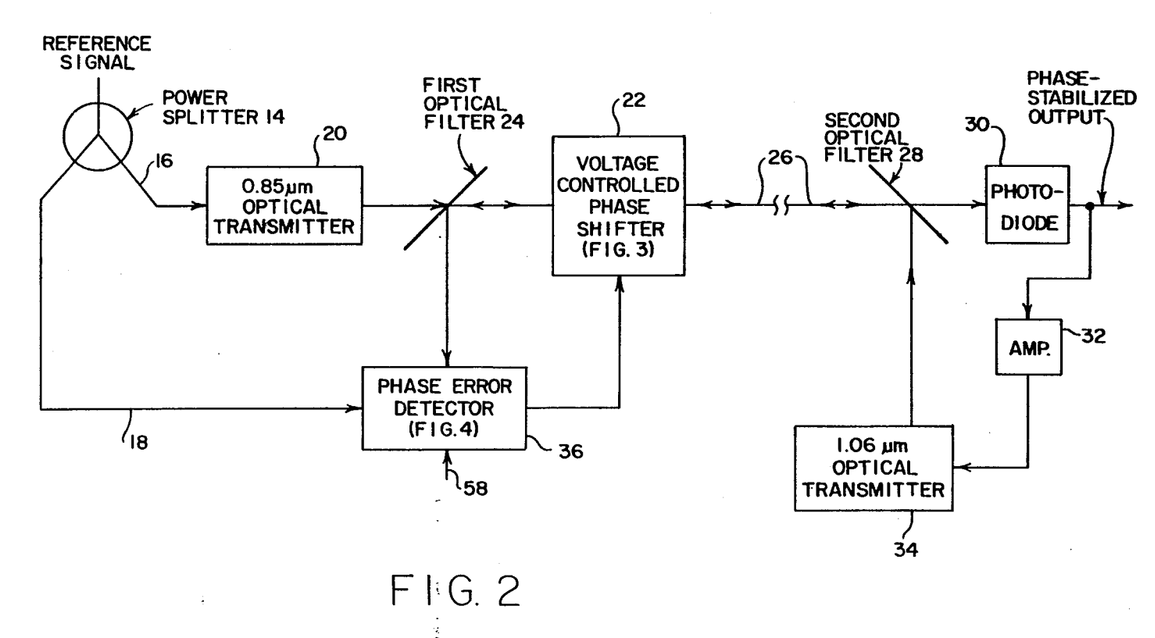
FIG. 2 is a block diagram of a fiber optic transmission line stabilizer provided by the invention.

Referring now to FIG. 2, a fiber optic transmission line stabilizer according to the invention is shown. A microwave reference signal or first reference signal is divided by a power splitter 14 and provided to a first reference line 16 and a second reference line 18. The stabilizer includes a first optical transmitter 20 and a voltage-controlled phase shifter 22 which is in communication with the optical transmitter 20 through a first optical filter 24. The first optical transmitter 20 is chosen to have an output signal having a wavelength of 0.85 micrometers. A fiber optic transmission line 26 is provided between the voltage-controlled phase shifter 22 and a second optical filter 28. The stabilizer further includes a photodiode 30 for demodulating the output of the voltage-controlled phase shifter 22, and an amplifier 32 for providing a signal related to the demodulated output signal from the photodiode 30 to a second optical transmitter 34 which provides a second optical output signal having a wavelength of 1.06 micrometers. The output of the photodiode 30 is referred to as a second reference signal, and becomes phase-stabilized with respect to the first reference signal as will be explained below. A phase error detector 36 is included for providing a phase control signal related to a phase difference between the first and second reference signals.

In operation, the first reference signal on line 16 modulates the first optical transmitter 20 which provides an intensity modulated optical output signal having an optical wave length of 0.85 micrometers, and an intensity modulation corresponding to amplitude changes of the first reference signal. This modulated first optical output signal is provided to the first optical filter 24 which is chosen to be substantially transparent to 0.85 micrometer wavelengths, and substantially reflective to 1.06 micrometer wavelengths. The output of the first optical filter 24 is provided to the voltage-controlled phase shifter 22 which, as will be explained below, changes the phase of the intensity modulation on the first optical output signal in accordance with the phase control signal provided by the phase error detector 36. The output of the voltage-controlled phase shifter 22 is then provided to the fiber optic transmission line 26 which interfaces with the second optical filter 28 which is also chosen to be substantially transparent to 0.85 micrometer wavelengths and substantially reflective to 1.06 micrometer wavelengths. The modulated first optical output signal passes through the second optical filter 28 to the photodiode 30 which generates the second reference signal having an amplitude corresponding to the intensity modulation on the 0.85 micrometer optical input signal. The second reference signal is amplified by the amplifier 32, the output of which intensity modulates a second optical output signal provided by the 1.06 micrometer optical transmitter 34. This signal is provided to the second optical filter 28 where it is reflected back through the fiber optic transmission line 26 to the voltage-controlled phase shifter 22. The phase of the intensity modulation on this signal is also altered in accordance with the value of the phase control signal from the phase error detector 36. The second optical signal from the voltage-controlled phase shifter 32 is provided to the first optical filter 24 where it is reflected into the phase error detector 36. The other input to the phase error detector 36 is the first reference signal on the second reference line 18. The difference in phases between the modulation on the second optical output signal and the first reference signal generates the phase control signal which is provided to the voltage controlled phase shifter 22 to control the phase shift in the first and second optical output signals passing therethrough. The control voltage alters the phase of the two signals until a predetermined phase difference between the first and second reference signals is achieved. At this time, the second reference signal at the output of the photodiode 30 becomes phase stabilized with respect to the first reference signal, thereby resulting in a tracking accuracy between the phase-stabilized second reference signal and the first reference signal which has been heretofore unachievable by conventional phase stabilizers.

Figure 3:
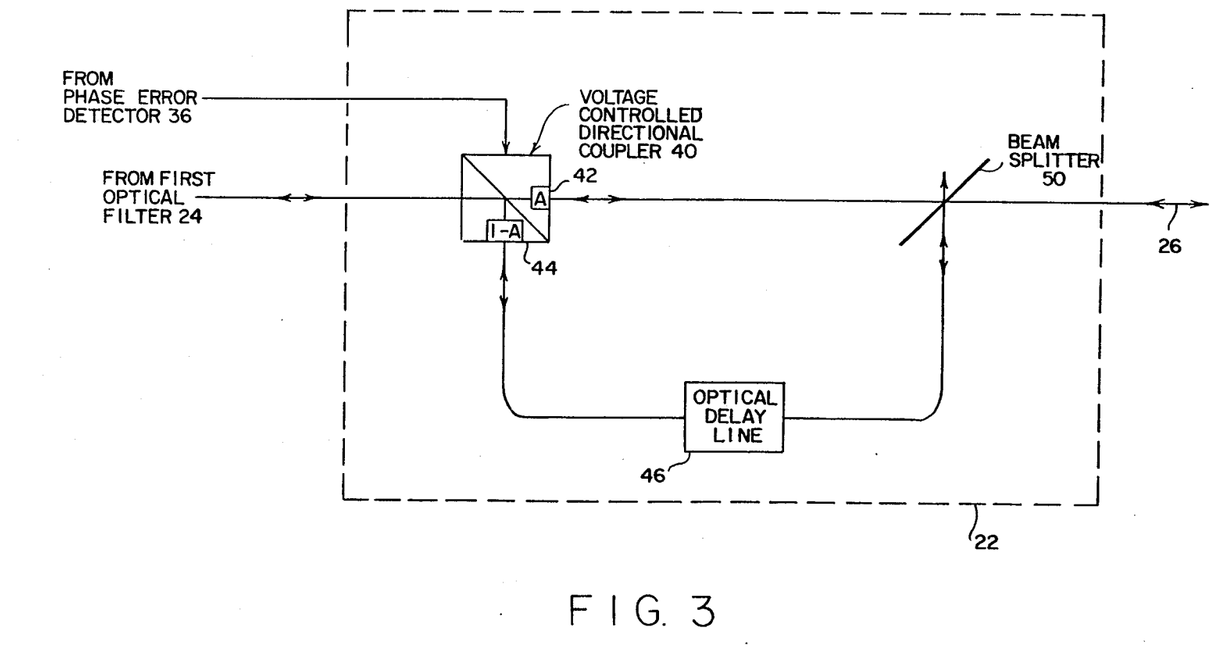
FIG. 3 is a block diagram of the voltage controlled phase shifter shown in FIG. 2.

The voltage-controlled phase shifter 22 is shown in further detail in FIG. 3. A voltage-controlled directional coupler 40 is a conventional directional coupler wherein an input signal is divided into two output signals having an amplitude relationship with respect to each other that is determined by a control signal which in the exemplary embodiment is the phase control signal from the phase error detector 36. The voltage controlled directional coupler 40 has a first intermediate output port 42 and a second intermediate output port 44, the first intermediate output port 42 providing an output signal having an amplitude A with respect to the incoming signal and the second intermediate output port 44 providing an output signal having an amplitude 1-A with respect to the input signal, A being less than 1. Thus, the signal from the first intermediate output port 42 and the signal from the second intermediate output port 44 have an amplitude ratio with respect to each other that is related to the phase difference between the second reference signal and the first reference signal. An optical delay line 46 connects the output of the second intermediate port 44 to a beam splitter 50. Thus, the signals from the first intermediate output port 42 and the second intermediate output port 44 are combined by the beam splitter 50 and provided as an output signal to the fiber optic transmission line 26. As can be appreciated, the phase delay of the modulation on the signal from the second intermediate output port 44 when combined with the signal from the first intermediate output port 42 results in an optical output signal to the fiber optic transmission line 26 which has a phase relationship with respect to the input signal from the first optical filter 24 that is determined by the phase control signal from the phase error detector 36. Accordingly, if A equals 1, then the phase of the optical signal modulation will not be altered by the voltage controlled phase shifter 22. However, if A should equal 0, then the phase of the optical signal modulation will be delayed by the amount induced by the optical delay line 40. As A varies between 0 and 1, the phase can be adjusted between these two limits. The optical delay line 46 within the voltage controlled phase shifter 22 must be long compared with the coherence length of the optical carrier at 0.85 and 1.06 micrometers so that addition of the signal at the beam splitter 50 occurs incoherently. Thus, any optical interference effect can be disregarded.

The 1.06 micrometer or second optical output signal returning via the fiber optic transmission line 26 is split by the beam splitter 50 into two signals having equal amplitudes. The signal that is reflected downwardly from the beam splitter 50 passes through the optical delay line 46 to the second intermediate output port 44 and the signal that passes through the beam splitter 50 enters the first intermediate output port 42. These signals are combined in accordance with the value of A determined by the output of the phase error detector 36 and are provided to the first optical filter 24 and thus to the phase error detector 36. As can be appreciated, the phase shift induced in the outgoing or 0.85 micrometer wavelength optical signal is substantially identical to the phase shift introduced in the incoming or 1.06 micrometer wavelength optical signal. An analytical analysis of the operation of the voltage controlled phase shifter 22 will be provided below.

Figure 4:
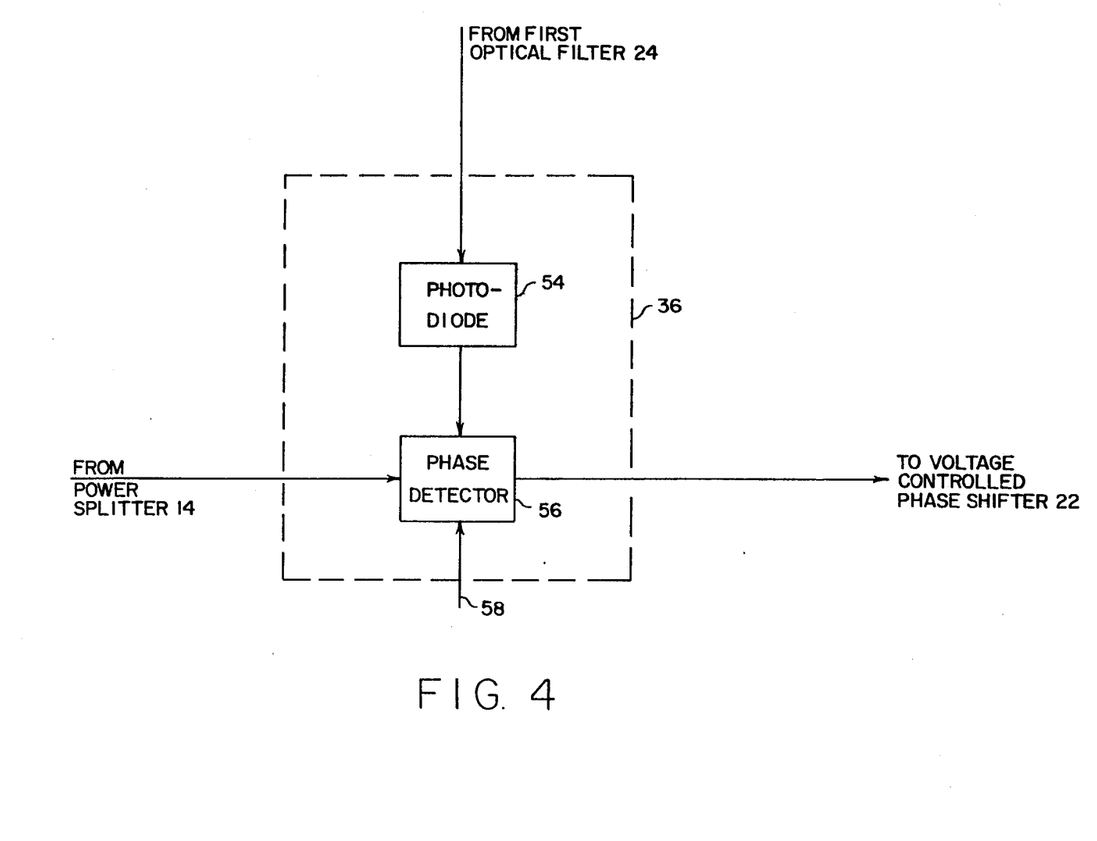
FIG. 4 is a block diagram of the phase error detector shown in FIG. 2.

The phase error detector 36 shown in FIG. 4 includes a photodiode 54 and a phase detector 56. The second optical signal at 1.06 micrometers is provided as an input to the phase error detector 36 by the first optical filter 24. The photodiode 54 provides an output signal related to the modulation on the second optical signal. This modulation is compared to the first reference signal from the power splitter 14 by the photodetector 56 which in turn provides an output voltage related to a phase difference between those two signals. The phase detector 56 also has a bias signal input 58 which allows a predetermined phase control signal to be provided to the voltage controlled phase shifter 22 for a predetermined phase difference between the phase detector 56 input signals. The phase detector 56 is a standard type phase detector well known to those familiar with electronic processing equipment.

Figure 5:
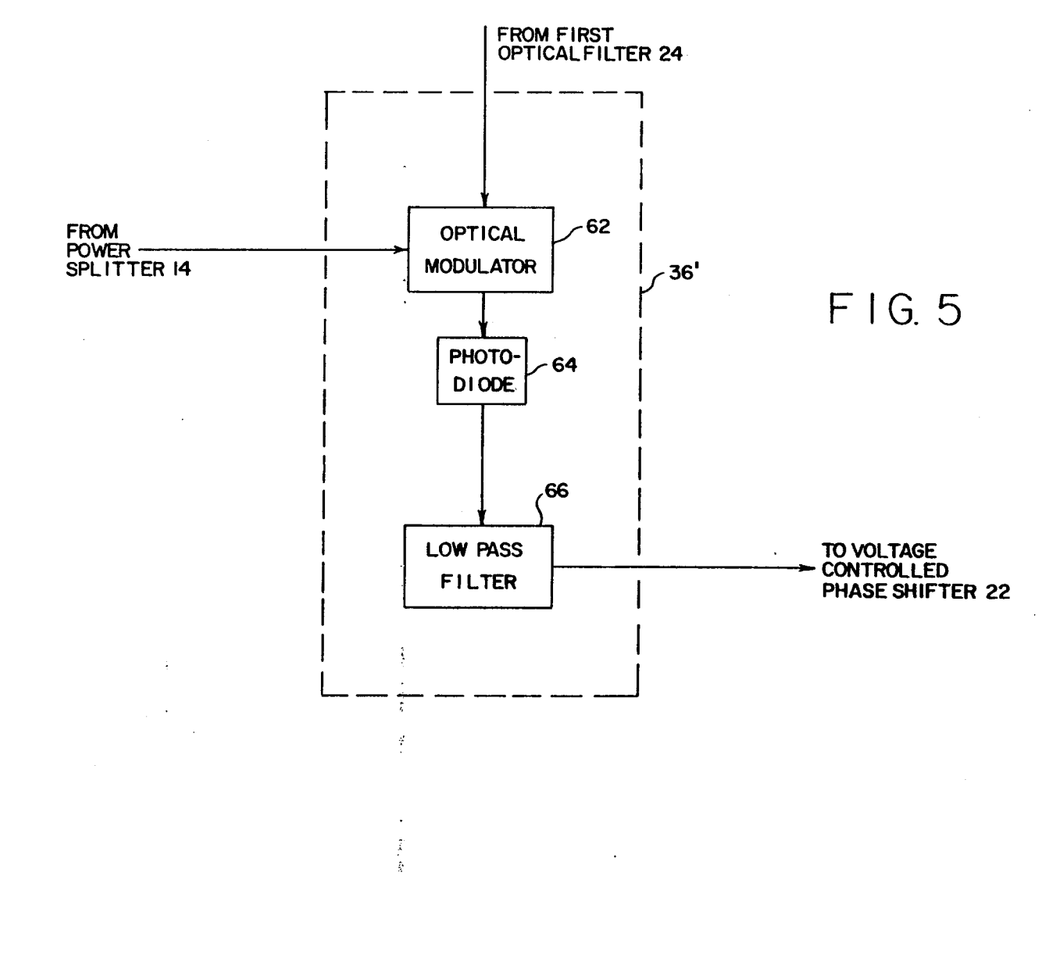
FIG. 5 is a further embodiment of the phase error detector.

A further embodiment of the phase error detector 36' is shown in FIG. 5. Here, an optical modulator 62, a photodiode 64 and a low pass filter 66 are combined to provide the phase control signal to the voltage controlled phase shifter 22. The 1.06 micrometer wavelength signal from the first optical filter 24 is provided as one input to the optical modulator 62. This signal, as previously explained, contains modulation related to that of the second reference signal from the photodiode 30. The other input to the optical modulator 62 is the first reference signal from the power splitter 14. The output of the optical modulator 62 is provided to the photodiode 64 which in turn provides an output signal related to the modulation on the output signal from the optical modulator 62. This signal is provided to the low pass filter 66 which in turn provides the phase control signal to the voltage controlled phase shifter 22.

The phase $\psi$ of the recombined signal from the beam splitter 50 is controlled by the splitting coefficient A as previously explained. A zero phase shift occurs if A equals zero, and A equals one corresponds to a phase shift of $\beta l$, where l is the delay line 46 length and $\beta$ the propagation constant at that optical frequency. Therefore, $$\psi = \tan^{-1} \frac{A \sin \beta l}{A \cos \beta l + 1 - A}$$

and the recombined signal is thus $$1 + p \cos \psi$$

where $$p = ((A \sin \beta l)^2 + (A \cos \beta l + 1 - A)^2)^{\frac{1}{2}}$$

Figure 6:
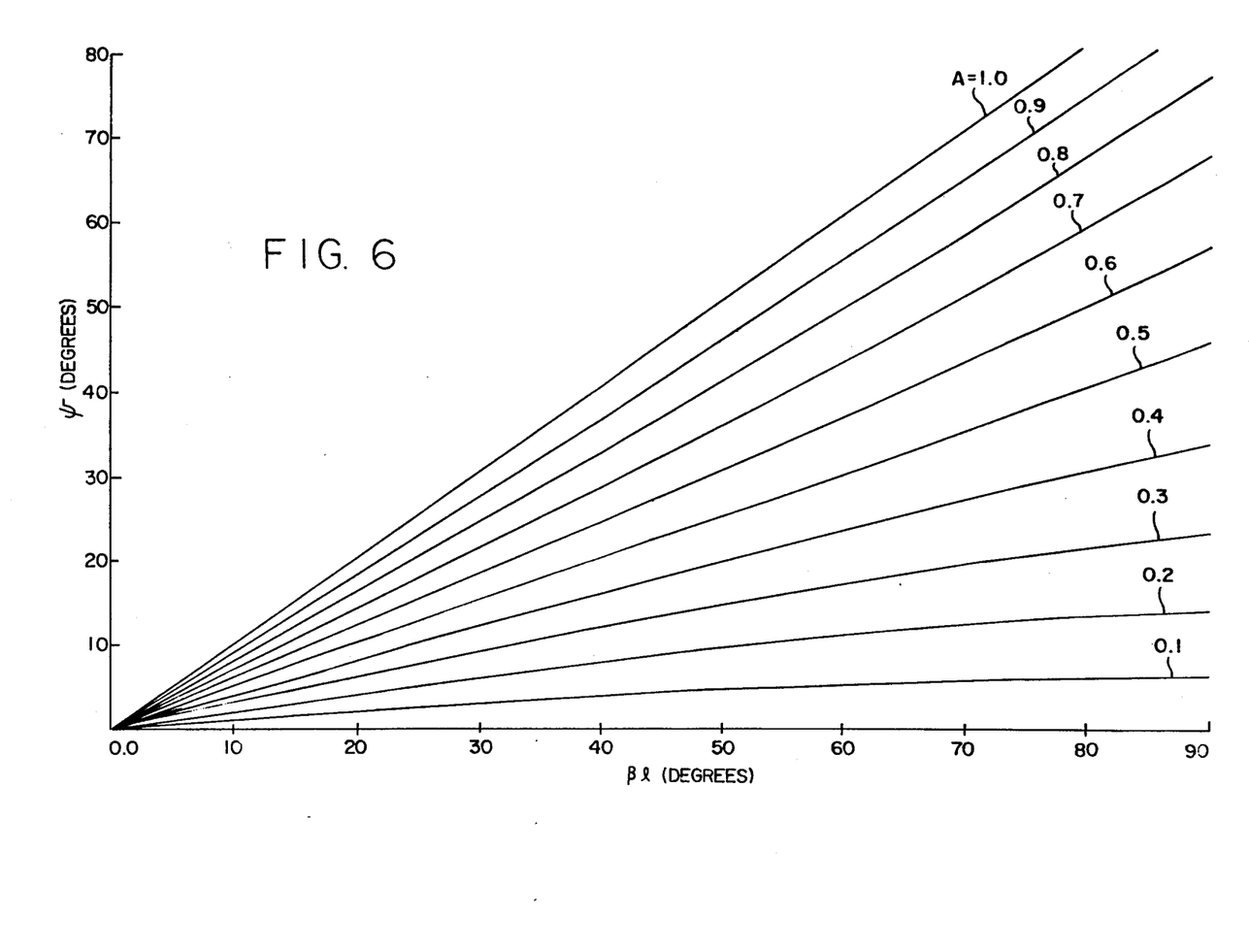
FIG. 6 is a plot of the phase $\psi$ of a recombined signal as a function of delay line length l and propagation constant $\beta$ for various splitting coefficients A.
Figure 7:
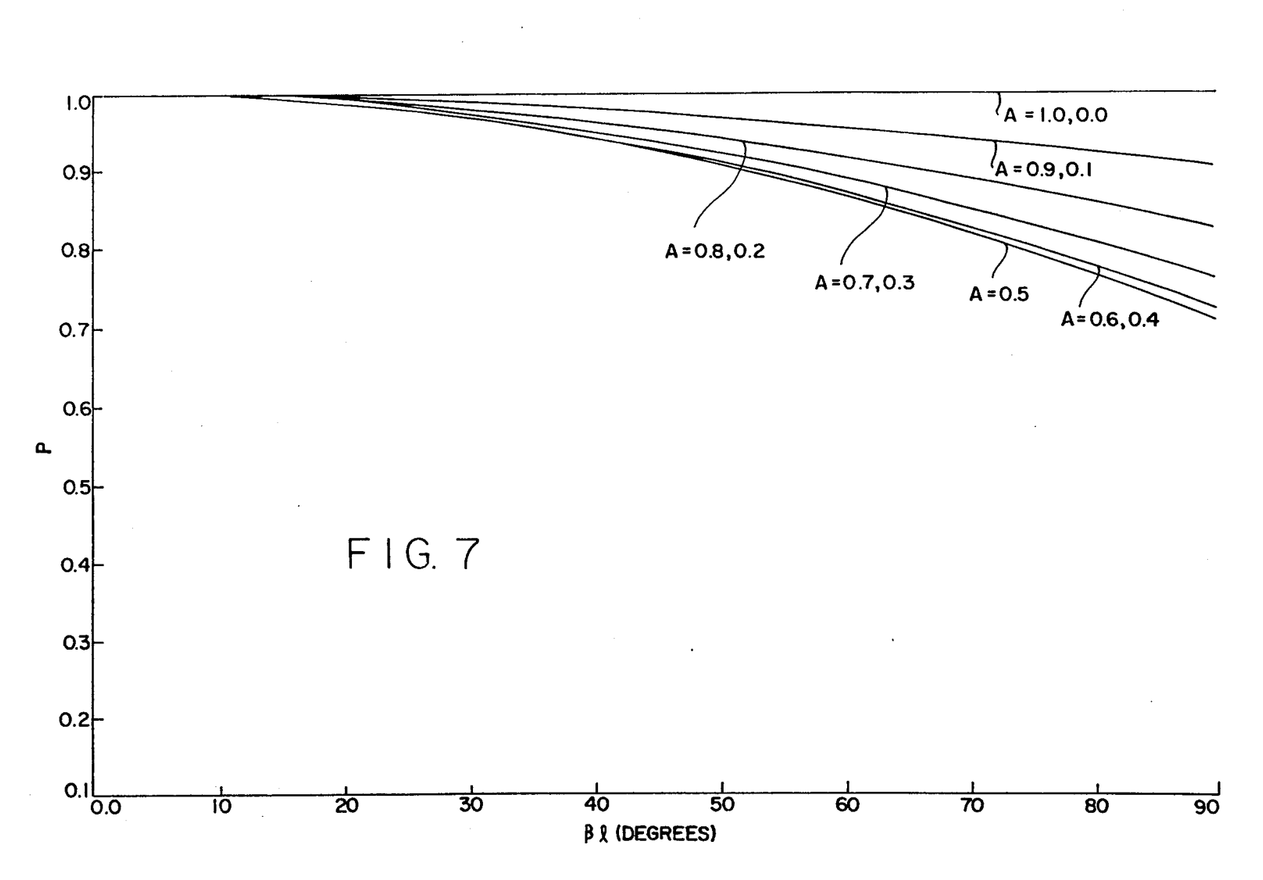
FIG. 7 is a plot of power loss (P) vs the delay line length and propagation constant $\beta$ for various splitting coefficients A.
Figure 8:
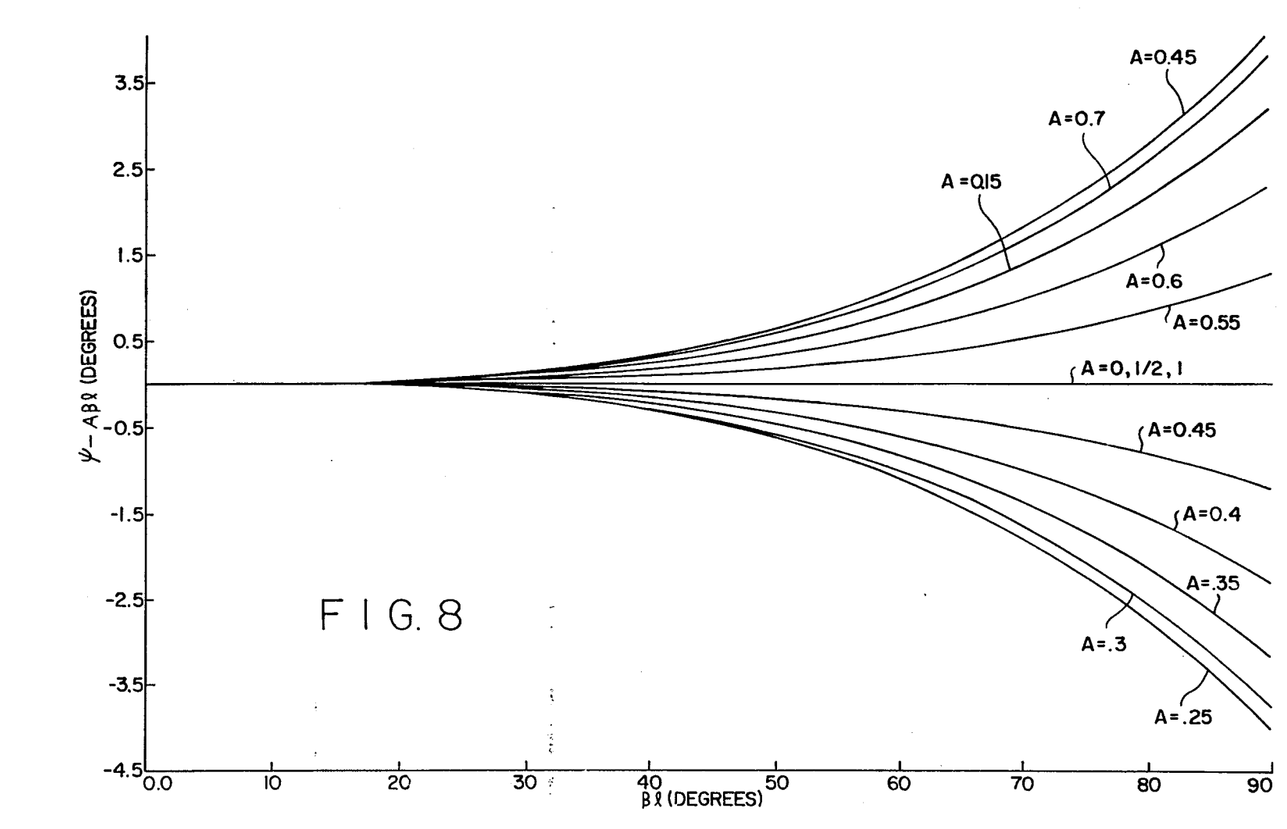
FIG. 8 is a plot of $\psi$-A$\beta$l vs $\beta$l for various splitting coefficients A.

Plots of $\psi$ and p vs $\beta l$ for different A's, are shown in FIGS. 6 and 7. It can be seen from FIG. 6 that $\psi$ is fairly linear with respect to $\beta l$ but not quite. In FIG. 8, $\psi$-A$\beta l$ is plotted vs $\beta l$ for different A's. For A=0, $\frac{1}{2}$ and 1, $\psi$-A$\beta l$ is exactly linear with respect to $\beta l$.

It would be desirable to have the linearity of $\psi$ vs $\beta l$ to hold for all values of A, since linearity is necessary for compensation of line dispersion. Referring again to FIG. 1, if the phase shifter 10, for example, introduces different phase shifts $E_1$ and $E_2$ on the forward and backward signals in proportion to their respective $\beta$'s, the phase shifts would appear as below:

$$\psi_1 = \phi \beta_1$$

$$\psi_2 = \phi \beta_2$$

$$\Delta \psi_1 = \Delta \phi \beta_1$$

$$\Delta \psi_2 = \Delta \phi \beta_2$$

To hold the phase of shift $E_3$ constant, the following equation would have to be satisfied:

$$-(\beta_1 + \beta_2) \Delta L = \Delta \psi_1 + \Delta \psi_2$$
$$= \Delta \phi (\beta_1 + \beta_2)$$

Thus, $$-\Delta \phi = \Delta L$$

and the phase at $E_2$ is $\beta_1(L+\Delta L)+\psi_1+\Delta\psi_1 = \beta_1 L + \psi_1$ independent of $\Delta L$, that is stabilized regardless of the line dispersion.

In order to ascertain how much error is introduced due to a slight non-linearity of $\psi$ vs $\beta l$, an approximate formula for $\psi$ near A=$\frac{1}{2}$ needs to be developed. Here, $$\psi = \tan^{-1} \left( \frac{A \sin \beta l}{A \cos \beta l + 1 - A} \right)$$

For A near $\frac{1}{2}$, A=$\frac{1}{2}$+$\epsilon$, so $$\psi = \tan^{-1} \left( \frac{\sin \beta l + 2\epsilon \sin \beta l}{\cos \beta l + 1 + 2\epsilon(\cos \beta l - 1)} \right)$$

$$= \tan^{-1} \left( \frac{\sin \beta l}{1 + \cos \beta l} \left( 1 + 2\epsilon \left( 1 - \frac{\cos \beta l - 1}{\cos \beta l + 1} \right) \right) \right)$$

$$= \tan^{-1} \left[ \left( \tan \frac{\beta L}{2} \right) \left( 1 + \frac{4\epsilon}{1 + \cos \beta L} \right) \right]$$

Using the expansion $$\tan^{-1}(x + \epsilon) = (x + \epsilon) - \frac{(X + \epsilon)^3}{3} + \frac{(X + \epsilon)^5}{5} + \ldots$$

$$= \left( x - \frac{x^3}{3} + \frac{x^5}{5} \ldots \right)$$

$$+ \epsilon(1 - x^2 + x^4 - x^6 + \ldots) + O(\epsilon^2)$$

$$= \tan^{-1} x + \frac{\epsilon}{1 + x^2} + \ldots$$

Thus $$\psi = \frac{\beta l}{2} + \frac{4\epsilon \tan \frac{\beta l}{2}}{(1 + \cos \beta 2)} \cdot \frac{1}{1 + \tan^2 \frac{\beta l}{2}}$$

$$= \frac{\beta l}{2} + 2\epsilon \tan \frac{\beta l}{2}$$

This formula is accurate to within seven percent for $\epsilon$ as large as $\pm 0.25$.

Thus $$\psi = \frac{\beta l}{2} + 2\epsilon \tan \frac{\beta l}{2}$$

where $$\epsilon = A - \tfrac{1}{2}.$$

and l as before is the length of the optical delay line 46. The tangent term produces the undesirable non-linearity. The phase shift introduced to the forward and backward signals are thus respectively $$\psi_1 = \frac{\beta_1 l}{2} + 2\epsilon \tan \frac{\beta_1 l}{2}$$
$$\psi_2 = \frac{\beta_2 l}{2} + 2\epsilon \tan \frac{\beta_2 l}{2}$$

Assume initially that A is set to $\tfrac{1}{2}$ (i.e., $\epsilon=0$). Now, a change in the length of the fiber optic transmission line 26 ($\Delta L$) produces an error signal that changes A and thus $\psi_1$ and $\psi_2$:

$$\Delta\psi_1 = 2\epsilon \tan\left(\frac{\beta_1 l}{2}\right)$$

$$\Delta\psi_2 = 2\epsilon \tan\left(\frac{\beta_2 l}{2}\right)$$

The amount of change in A necessary for phase stabilization is thus:

$$\Delta\psi_1 + \Delta\psi_2 = -\Delta L(\beta_1 + \beta_2)$$

hence giving $$\epsilon = -\frac{\Delta L}{2}\left(\frac{\beta_1 + \beta_2}{\tan\frac{\beta_1 l}{2} \tan\frac{\beta_2 l}{2}}\right)$$

With this change, the change in phase at the second optical filter 28 is $$\delta = \beta_1 \Delta L + \Delta\psi_1$$
$$= \beta_1 \Delta L + 2\epsilon \tan \frac{\beta_1 l}{2}$$
$$= \left[\beta_1 - \frac{\left(\tan \frac{\beta_1 l}{2}\right) \Delta L (\beta_1 + \beta_2)}{\tan \frac{\beta_1 l}{2} + \tan \frac{\beta_2 l}{2}}\right]\Delta L$$

It would be desirable if $\delta$ would be equal to zero as would be the case if the tangent functions were replaced by linear functions (i.e., $\delta$-shifter linear in $\beta$), or $\beta_1 = \beta_2$ (i.e., no dispersion).

To approximate $$\tan \frac{\beta l}{2} = \frac{\beta l}{2} + \tfrac{1}{3}\left(\frac{\beta l}{2}\right)^3$$

For the range of interest, $\beta l < \pi/2$, the above expression is accurate to within five percent. Substitution gives $$\delta = \left(\frac{\beta_1}{12}\right)\left(\beta_1{}^2 - \frac{\beta_1{}^3 + \beta_2{}^3}{\beta_1 + \beta_2}\right) l^2 \Delta L.$$

For example, at a carrier wavelength of $0.85\mu$, $\beta = \beta_1 = 2\pi/3984$ cm for 5 MHz modulating signal, and at $1.06\mu$, $\beta = \beta_2 = 2\pi/3989$ cm. Thus, $\beta_2 = \beta_1 + \delta\beta$, where $\delta\beta$ is small. Substitution into the above equation provides to a first order in $\delta\beta$.

$$\delta = \left(\frac{\beta_1}{12}\right)\left(\beta_1{}^3 - \frac{2\beta_1{}^3 + 3\beta_1{}^2 \partial\beta}{2\beta_1 + \partial\beta}\right) l^2 \Delta L$$

$$\approx \frac{\beta_1{}^3}{12}\left(1 - \left(1 + \frac{3}{2}\cdot\frac{\partial\beta}{\beta_1}\right)\left(1 - \frac{\partial\beta}{2\beta_1}\right)\right) l^2 \Delta L$$

$$\delta \approx \frac{\beta_1{}^2 l^2}{12} \partial\beta\Delta L$$

As expected, this phase error is small when $\beta l$ is small, for then $\psi$ is more linear in $\beta l$.

Thus, it can be appreciated that a fiber optic transmission stabilizer has been described which provides a phase-stabilized reference signal with respect to a source reference signal having a phase stability heretofore unachieved by conventional phase stabilization systems.

What is claimed is:

1. A fiber optic transmission line stabilizer for providing a phase-stabilized signal at a receiving end of a fiber optic transmission line with respect to a first reference signal at a transmitting end of said fiber optic transmission line so that said phase-stabilized signal will have a predetermined phase relationship with respect to said first reference signal, said stabilizer comprising:

a first optical transmitter having a first optical output signal at a first optical wavelength, said first optical output signal being modulated by said first reference signal;

a voltage controlled phase shifter responsive to a phase-shift control signal for shifting the phase of said first reference signal modulation on said first optical output signal, the phase-shifted output signal of said voltage controlled phase shifter being provided to said fiber optic transmission line transmitting end;

means for generating a second reference signal at the receiving end of said fiber optic transmission line, said second reference signal being derived from modulation on the phase-shifted output signal of said voltage controlled phase shifter;

a second optical transmitter having a second optical output signal at a second optical wavelength, said second optical output signal being modulated by a signal related to said second reference signal;

means for providing said second optical output signal to said fiber optic transmitting line receiving end;

a phase-error detector for generating said phase-shift control signal, said control signal being related to a phase difference between two input signals;

means for providing a signal related to the modulation on said second optical output signal as received at the transmitting end of said fiber optic transmission line to said phase-error detector;

means for providing said first reference signal to said phase-error detector, said first reference signal and said signal related to the modulation on said second optical output signal comprising said phase-error detector two input signals; and means for providing said phase-shift control signal to said voltage controlled phase shifter thereby causing the phase of the modulation on said first optical output signal to be altered until the phase of said second reference signal has a predetermined relationship with respect to the phase of said first reference signal, said second reference signal then defining said phase stabilized signal.

2. The stabilizer of claim 1 wherein said voltage controlled phase shifter comprises:

a voltage controlled directional coupler responsive to said phase-shift control signal for dividing said first optical output signal into first and second intermediate optical signals having an amplitude relationship with respect to each other that is determined by said phase-shift control signal;

means for delaying one of said intermediate optical signals so that the phase of the modulation contained thereon is altered with respect to the phase of the modulation on the other intermediate optical signal; and means for combining said phase-altered intermediate optical signal and the other intermediate optical signal, thereby providing said phase-shifted output signal to said fiber optic transmission line.

3. The stabilizer of claim 2 wherein said means for delaying comprises a fiber optic delay line.

4. The stabilizer of claim 3 wherein said means for combining comprises a beam splitter.

5. The stabilizer of claim 1 wherein said phase error detector comprises:

detecting means for generating a signal related to the modulation on said second optical output signal as received at the transmitting end of said fiber optic transmission line; and means for generating said phase-shift control signal having an amplitude related to a phase difference between said signal provided by said detecting means and said first reference signal.

6. The stabilizer of claim 5 wherein said detecting means comprises a photodiode.

7. The stabilizer of claim 1 wherein said phase-error detector comprises:

an optical modulator for providing a third optical output signal modulated in accordance with the phase difference between said first reference signal and the modulation on said second optical output signal as received at the transmitting end of said fiber optic transmission line; and demodulation means for generating a signal related to the modulation on said third optical output signal, said signal comprising said phase-shift control signal.

8. The stabilizer of claim 7 wherein said demodulation means comprises:

a photodetector having said third optical output signal as an input signal; and low pass filter means for filtering an output signal from said photodetector, the output of said low pass filter means comprising said phase shift control signal.

9. The stabilizer of claim 1 wherein said means for providing said second optical output signal to said fiber optic transmission line receiving end comprises a first optical filter which is substantially transparent with respect to said first optical wavelength and is substantially reflective with respect to said second optical wavelength.

10. The stabilizer of claim 9 wherein means for generating said second reference signal at the receiving end of said fiber optic transmission line comprises a photodiode.

11. The stabilizer of claim 1 wherein said first optical transmitter output signal is at an optical wavelength of 0.85 micrometers.

12. The stabilizer of claim 1 wherein said second optical transmitter output signal is at an optical wavelength of 1.06 micrometers.

13. The stabilizer of claim 9 wherein said means for providing a signal related to the modulation on said second optical output signal comprises a second optical filter which is substantially transparent with respect to said first optical wavelength and is substantially reflective with respect to said second optical wavelength.

14. A fiber optic transmission line stabilizer for providing a phase-stabilized reference signal at a receiving end of a fiber optic transmission line, said phase-stabilized reference signal having a predetermined phase relationship with respect to a first reference signal provided at a transmitting end of said fiber optic transmission line, said stabilizer comprising:

means for providing a first optical signal modulated by said first reference signal to said fiber optic transmission line transmitting end, said first optical signal being at a first optical wavelength;

means for developing a second reference signal related to the modulation on said first optical signal after having passed through said fiber optic transmission line;

means for providing a second optical signal modulated by said second reference signal to said fiber optic transmission line receiving end, said second optical signal being at a second optical wavelength;

means for simultaneously altering the phase of the modulation on said first optical signal and the phase of the modulation on said second optical signal in response to a phase shift control signal, and means for generating said phase-shift control signal in response to a phase difference between said first reference signal and the modulation on said second optical signal after having been altered by said means for simultaneously altering, thereby resulting in said second reference signal having a predetermined phase relationship with respect to said first reference signal, said second reference signal then defining said phase-stabilized reference signal.

15. The stabilizer of claim 14 wherein said means for simultaneously altering comprises:

a voltage controlled directional coupler for generating first and second intermediate signals from said first optical signal having an amplitude ratio related to the value of said phase shift control signal;

means for delaying said second intermediate signal; and means for combining said first intermediate signal and said delayed second intermediate signal, said means for combining also dividing said second optical signal into third and fourth intermediate signals whereby said fourth intermediate signal is delayed by said means for delaying, said voltage controlled directional coupler combining said third intermediate signal and said fourth delayed intermediate signal so that the phase of the modulation on said combined signal is related to the value of said phase shift control signal.

16. The stabilizer of claim 15 wherein said means for delaying comprises an optical delay line.

17. The stabilizer of claim 16 wherein said means for combining comprises a beam splitter.

18. A voltage controlled phase shifter for simultaneously altering the phase of first and second optical signals comprising:

a voltage controlled directional coupler having a reference signal input/output port, a first intermediate signal input/output port, a second intermediate signal input/output port, and a control signal port;

means for providing said first optical signal at a first optical wavelength to said reference signal input/output port whereby said voltage controlled directional coupler provides a first intermediate signal at said first intermediate signal input/output port and a second intermediate signal at said second intermediate signal input/output port, the amplitude ratio between said first and second intermediate signals being related to a signal provided to said control signal port;

combining means for combining said first and second intermediate signals and for dividing said second optical signal at a second optical wavelength into third and fourth intermediate signals, the combined first and second intermediate signals defining a phase altered first optical signal;

delay means interconnecting said second intermediate signal input/output port and said combining means for simultaneously delaying said second intermediate signal as it passes from said second intermediate input/output port to said combining means and said fourth intermediate signal as it passes from said combining means to said second intermediate signal input/output port; and means for interconnecting said first intermediate signal input/output port and said combining means for simultaneously passing said first intermediate signal from said first intermediate signal input/output port to said combining means and said third intermediate signal from said combining means to said first intermediate signal input/output port whereby said third intermediate signal and said fourth intermediate signal are summed by said directional coupler as though they had an amplitude ratio the same as that between said first and second intermediate signals as they pass from said first and said second intermediate signal input/output ports, respectively, the summed third and fourth intermediate signals defining a phase altered second optical signal that exits said voltage controlled directional coupler reference signal input/output port simultaneously as said first optical signal enters said reference signal input/output port.

19. The phase shifter of claim 18 wherein said combining means comprises a beam splitter.

20. The phase shifter of claim 18 wherein said delay means comprises an optical delay line.

21. A method for providing a phase-stabilzied signal at a receiving end of a fiber optic transmission line, said phase stabilized signal having a predetermined phase relationship with respect to a first reference signal provided at a transmitting end of said fiber optic transmission line, said method comprising the steps of:

providing a first optical signal modulated by said first reference signal to said fiber optic transmission line transmitting end, said first optical signal being at a first optical wavelength;

developing a second reference signal related to the modulation on said first optical signal after having passed through said fiber optic transmission line;

providing a second optical signal modulated by said second reference signal to said fiber optic transmission line transmitting end, said second optical signal being at a second optical wavelength;

simultaneously altering the phase of the modulation on said first optical signal and the phase of the modulation on said second optical signal in response to a phase-shift control signal; and generating said phase-shift control signal in response to a phase difference between said first reference signal and the modulation on said second optical signal after having been altered by said simultaneously altering step, thereby resulting in said second reference signal having a predetermined phase relationship with respect to said first reference signal, said second reference signal then defining said phase stabilized signal.

* * * * *